US011066251B2

(12) United States Patent
Hanssen et al.

(10) Patent No.: US 11,066,251 B2
(45) Date of Patent: Jul. 20, 2021

(54) BOARD CONVEYOR

(71) Applicants: Ralf Hanssen, Brueggen (DE); Lothar Steiner, Wachtendonk (DE); Michael Vaessen, Neuss (DE); Christian Weiner, Meerbusch (DE)

(72) Inventors: Ralf Hanssen, Brueggen (DE); Lothar Steiner, Wachtendonk (DE); Michael Vaessen, Neuss (DE); Christian Weiner, Meerbusch (DE)

(73) Assignee: SIEMPELKAMP MASCHINEN- UND ANLAGENBAU GMBH, Krefeld (DE)

(*) Notice: Subject to any disclaimer, the term of this patent is extended or adjusted under 35 U.S.C. 154(b) by 0 days.

(21) Appl. No.: 16/817,663

(22) Filed: Mar. 13, 2020

(65) Prior Publication Data
US 2020/0290821 A1    Sep. 17, 2020

(30) Foreign Application Priority Data
Mar. 13, 2019   (DE) .......................... 102019001784.6

(51) Int. Cl.
*B65G 47/64* (2006.01)
*B07C 5/36* (2006.01)
*B65G 21/22* (2006.01)
*B65G 37/00* (2006.01)
*B65G 43/08* (2006.01)

(52) U.S. Cl.
CPC .............. *B65G 47/643* (2013.01); *B07C 5/36* (2013.01); *B65G 21/22* (2013.01); *B65G 37/005* (2013.01); *B65G 43/08* (2013.01); *B65G 2201/0282* (2013.01); *B65G 2203/042* (2013.01)

(58) Field of Classification Search
CPC .. B65G 47/641; B65G 47/642; B65G 47/643; B65G 47/5181; B65G 57/11; B65G 57/03; B65G 57/035; B65G 59/026; B07C 5/36
See application file for complete search history.

(56) References Cited

U.S. PATENT DOCUMENTS

| 2,981,399 | A | * | 4/1961 | Parker ................... | B65G 47/54 |
| | | | | | 198/369.2 |
| 5,421,446 | A | * | 6/1995 | Koch .................. | B65G 47/647 |
| | | | | | 198/369.7 |
| 7,275,635 | B2 | * | 10/2007 | Enya ..................... | B65G 37/02 |
| | | | | | 198/463.2 |

FOREIGN PATENT DOCUMENTS

DE    1925780 A1 * 12/1970 ............ B65G 57/11
EP    1900658 A1    3/2008

* cited by examiner

*Primary Examiner* — William R Harp
(74) *Attorney, Agent, or Firm* — Andrew Wilford

(57) ABSTRACT

A conveyor for transporting a board along a path in a transport direction has an upstream section, a downstream section aligned with the upstream section and defining therewith a horizontal support plane, and a center section between the upstream and downstream sections. The center section is movable from a pass-through position aligned and level with the upstream and downstream sections to an offset position spaced therefrom horizontally or vertically. A platform underneath the center section is moveable vertically, and a lift moves the platform vertically between upper and lower positions. Hooks or grab can, when the center section is in the offset position and the platform is in the lower position, either pull a board off the platform and onto the downstream section or guide and deposit a board from the upstream section onto the platform.

13 Claims, 4 Drawing Sheets

BOARD CONVEYOR

FIELD OF THE INVENTION

The present invention relates to a conveyor. More particularly this invention concerns a conveyor for moving boards or panels in a manufacturing plant.

BACKGROUND OF THE INVENTION

In the manufacture or treatment of large-format boards, it is standard to move the boards along a path on rollers or endless belts between treatment stations. Such a conveyor normally has at least one infeed and/or outfeed device within the movement path for moving the boards transversely of their travel direction toward and/or away from the transport path.

The method also relates to a method of feeding boards in and/or out in a conveyor for boards by means of which a board can be transported on a movement path that is supported by rollers or endless belts from a first treatment station to a second treatment station along a travel direction.

"Boards" are understood primarily as wood-based panels that have already been manufactured in a preferably continuous press and subsequently cut with saws. These include for example chipboards, MDF boards, or oriented-strand boards.

The treatment stations in the preamble are primarily cutting devices and surface finishing devices. The travel direction can run from a surface finishing device to a final cutting device or also from a board cutter to a surface finishing device. The transport path for the boards is usually a flat roller conveyor or travel path for the boards that is supported by carrying straps. Other supports such as gas cushions or sliding surfaces are also encompassed by the invention.

In the past, infeed and/or outfeed devices were separate arrangements that were used at the upstream or downstream end of the conveyor extending along a transport path from a first to a second treatment station. In order to remove boards that were of a lower quality, for example, complex switch arrangements were necessary. For example, guide rollers or conveyor belts were vertically offset in order to redirect boards to different adjacent paths.

OBJECTS OF THE INVENTION

It is therefore an object of the present invention to provide an improved board conveyor.

Another object is the provision of such an improved board conveyor that overcomes the above-given disadvantages, in particular that is very compact despite its ability to feed a board into the conveyor and/or feed one out of the conveyor.

SUMMARY OF THE INVENTION

A conveyor for transporting a board along a path in a transport direction between treatment stations has according to the invention an upstream conveyor section, a downstream conveyor section spaced downstream in the direction from and aligned with the upstream section and defining therewith a horizontal support plane, and a center conveyor section between the upstream and downstream conveyor sections. The sections are each provided with drivable rollers or belts for moving the board from the upstream section through the center section into the downstream section. The center conveyor section is movable transversely of the direction from a pass-through position aligned and level with the upstream and downstream sections to an offset position spaced therefrom horizontally or vertically. A platform underneath the center section is moveable vertically between an upper position spaced below the plane and a lower position level with the plane, and a lift moves the platform vertically between the upper and lower positions. Means such as hooks or grab can, when the center section is in the offset position and the platform is in the lower position, either pull a board off the platform and onto the downstream section or guide and deposit a board from the upstream section onto the platform.

Thus the object is achieved by virtue of the fact that a center section of the transport path that is formed by rollers or endless belts can be removed in a direction other than the travel direction and the conveyor has a lift that is beneath the center section and capable of feeding boards onto and/or receiving boards from the transport path.

The basic idea is simply to move a portion of the transport path, i.e. the center section, to the side and thus save space by lifting and introducing boards from below with the lift or by receiving sorted-out boards on the lift and moving them downward out of the transport path. To achieve this, the section must understandably have at least the length of a board in the travel direction. Nevertheless, the effort and expense is substantially less and more space-saving than with the complicated switching arrangements of the past.

Therefore, the lift is capable of feeding boards to and receiving boards from the transport path.

To this end, the lift has a platform for at least one board. Its vertical travel is designed to be large enough that it extends from a receiving position or delivery position at the lowest point to near the transport path. In the receiving position or delivery position, it is possible for at least one board to be comfortably introduced or removed, for example with a transport vehicle.

It is advantageous if the lifting device is capable of receiving a stack of boards.

In that case, it is possible for a plurality of boards to be picked up one after another from the lifting device without space-consuming delivery paths and then be taken away as a stack. Or, conversely, a plurality of boards can be introduced one after another into the transport path. For that purpose, the lifting device need only be capable of carrying out vertical movements in increments equal to the thickness of the board.

It is advantageous if the conveyor has drive elements that are capable of shifting the boards from the transport path to the lift or from the lift to the transport path.

These drive elements enable the introduction and removal process to be automated.

The conveyor preferably has guide elements and centering elements.

Such guide and centering elements can be used in a wide variety of locations in the conveyor. For example, the boards must be centered in the travel direction, aligned straight on the transport path, and placed on the lift with perfect edge alignment.

The conveyor has an infeed device and an outfeed device, one of which can optionally be used.

This arrangement offers the advantage that, in addition to the normal passage on the transport path from the first to the second treatment station, one of the two possibilities, namely the introduction of boards into or removal of boards from the flow, can be switched.

It is preferred that the infeed device and the outfeed device can be moved together. This way, there is a kind of toggle between the two options of introduction or removal. Then only those guidance and drive elements above the section of the transport path supported by rollers or endless belts that happen to be required at that moment are active.

The outfeed device includes the distal portion of the transport path supported by rollers or endless belts.

The second function of a guide device is assigned to the transport path supported by rollers or endless belts that was removed for discharging.

A quality detection sensor for the board is preferably arranged in the travel direction between the first treatment station and the section of the transport path that is supported by rollers or endless belts.

The quality of the board can thus be detected before it reaches the outfeed device. For example, if the board is classified as B-goods based on the optical image of its surface or its dimensions, the outfeed device can be activated via a center controller.

Finally, as far as the method is concerned, the object is achieved particularly by virtue of the fact that a section of the transport path that is supported by rollers or endless belts is removed in a direction other than the travel direction and a lift that is beneath the section feeds boards into the transport path and/or picks boards up therefrom.

The basic idea has already been described in the description of the device claims. In terms of the method, the transport process for the boards can be combined with the quality grading. Since, as a lift, the infeed requires only the space beneath the transport path, the process takes place in an extremely space-saving manner.

It is advantageous if boards are placed onto the transport path by drives and guide devices connected to the conveyor and/or are diverted from the transport path onto the lift.

It also saves time and space if the lift picks up a stack of boards and thereby carries out its operating stroke in increments equal to the thickness of a board.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
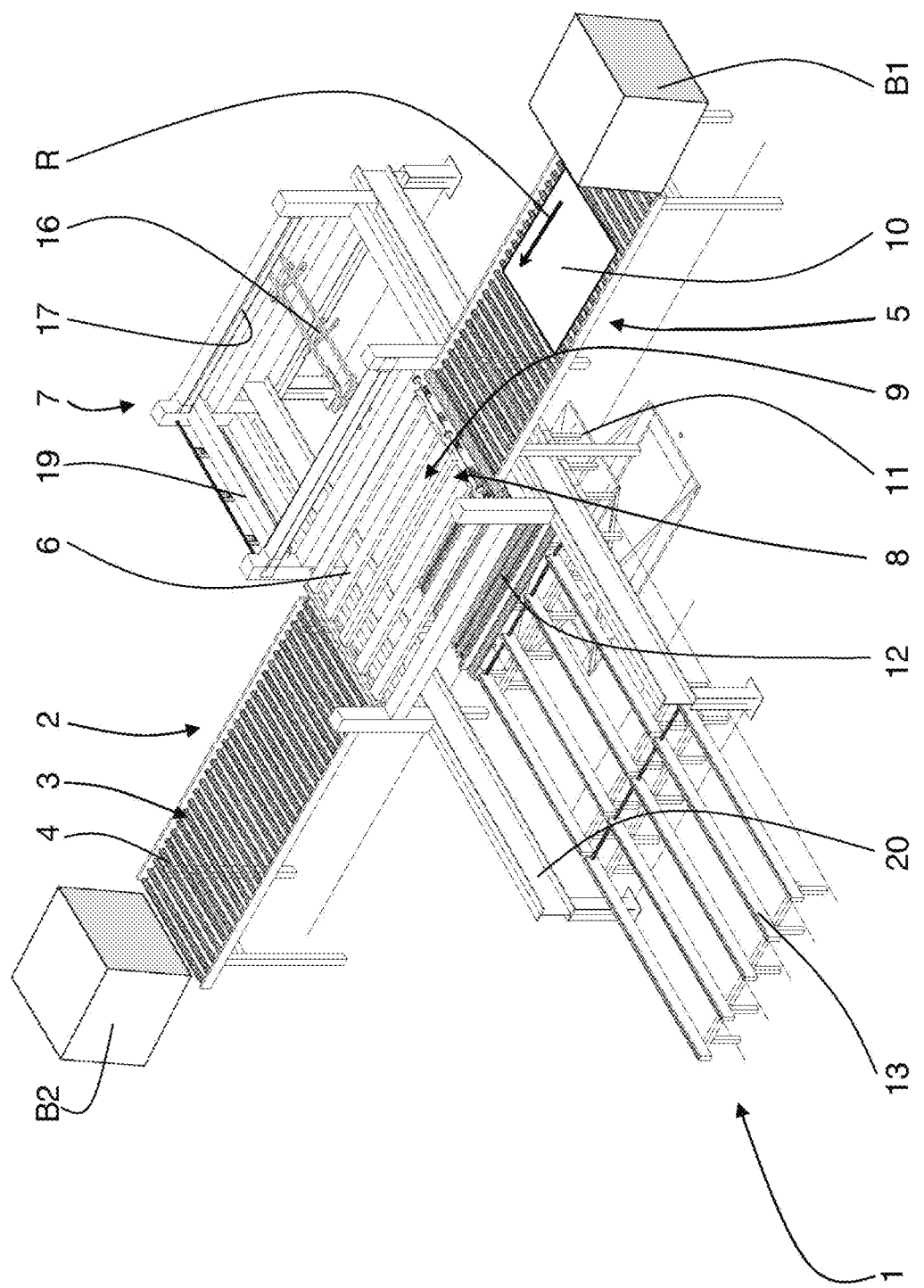
FIG. 1 is a perspective view of a conveyor according to the invention for transporting boards with an infeed and outfeed device in a pass-through position.

As seen in FIG. 1, a conveyor 1 according to the invention in its pass-through position moves boards 10 of which only one is shown in a longitudinal travel direction R from a first upstream treatment station B1, for example a surface finishing station, to a second downstream treatment station B2, for example a sawing installation, along a horizontal and straight movement path 2. This path 2 in turn is formed by an upstream conveyor section 5, a center conveyor section 9, and a downstream conveyor section 3. The treatment stations B1, B2 are shown here only schematically as boxes.

The boards 10 are each supported in the transport path 2 by driven rollers 4 or endless belts 6. In this embodiment for the sake of clarity the first section 5 from the treatment station B1 to a the section 9 of the transport path 2 has rollers 5, as does the section 3 from the center section 9 to the second treatment station B2, but the section 9 is formed by belts 6.

The transport path 2 extends the first treatment station B1 to the second treatment station B2. Section 9, which is essential to the invention and can be both belt-supported and roller-supported. The transport paths 3 and 5 are sections of the overall movement path 2.

Other movement paths are of course also possible within the scope of the invention. The rollers 4 or belts 6 shown for the sake of example are driven in order to transport the boards 10 easily. The conveyor 1 further comprises a lift 11 beneath the section 9 of the transport path 2. A ramp in the form of a chain-supported infeed and outfeed 13 in this embodiment can convey boards 10 to a platform 12 of the lift 11 or removed them therefrom, even as a stack of boards.

Furthermore, a switching frame 19 is provided that can be displaced on transverse rails 20. It has two alternative end positions. In the first, it functions as an outfeed device 8, and in the other as an infeed device 7 for boards. It can also be said that one half of the switching frame 19 (in front in FIGS. 1 to 3) carries the outfeed device 8 and the other half of the switching frame (to the rear in FIGS. 1 to 3) carries the infeed device 7. These two assumable positions are explained in more detail below.

Figure 2:
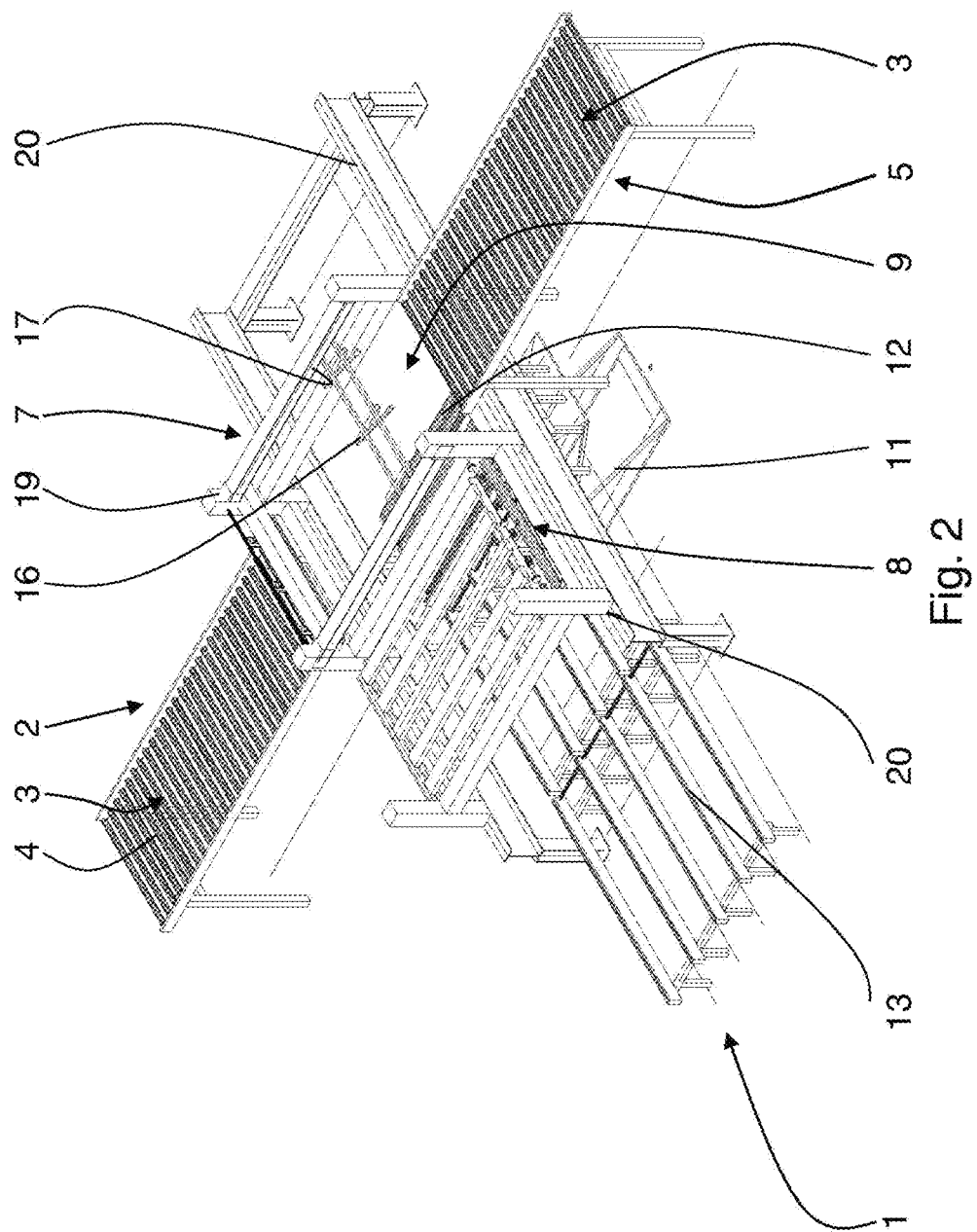
FIG. 2 is a similar view of the conveyor, but in an infeed position.

FIG. 2 shows the conveyor 1 with the infeed device 7 in use. To this end, the switching frame 19 has been moved (toward the front in the drawing). The conveyor belts 6 have thereby been moved horizontally and laterally from the section 9 of the transport path 2. This results in an opening between the downstream end of the upstream section 5 and the upstream end of the downstream section 3. Boards, and optionally also stacks thereof in increments that are on the lift 11 are raised until the uppermost board has arrived just above the transport path. Claws 16 that can be displaced on rails 17 grip an edge of the raised uppermost board and pull it board onto the roller-supported movement path 3 between the section 9 and the second treatment station B2. If there is a stack of boards on the platform 12 of the lift 11, it can be moved upward successively by the thickness of a board and the boards can be placed one after another onto the transport path 2. Such infeeding of boards is often performed when boards have been placed in a storeroom, for example for the purpose of drying or cooling, before they are able to be taken to the second treatment station B2.

Figure 3:
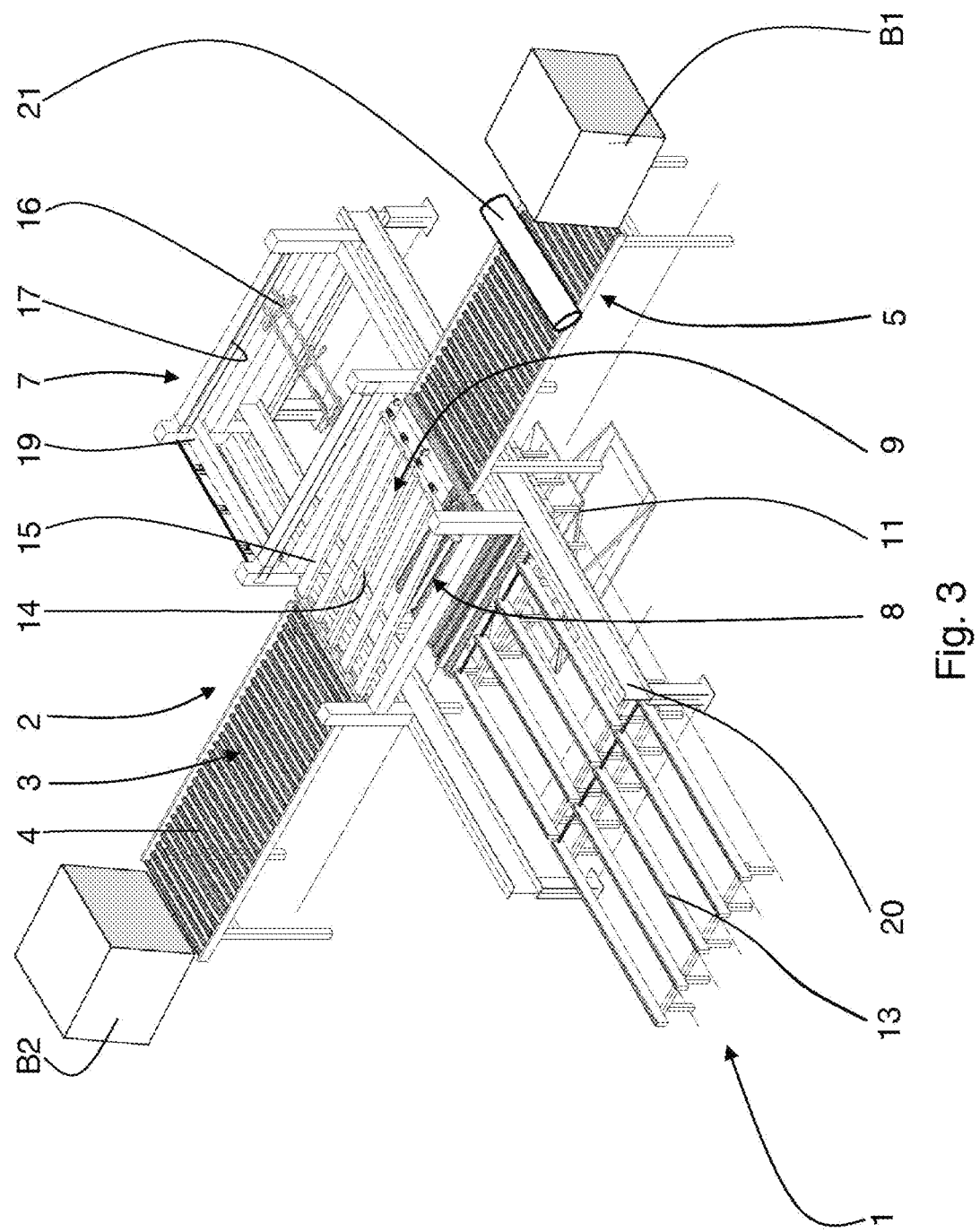
FIG. 3 is another perspective view the conveyor, but in an outfeed position.
Figure 4:
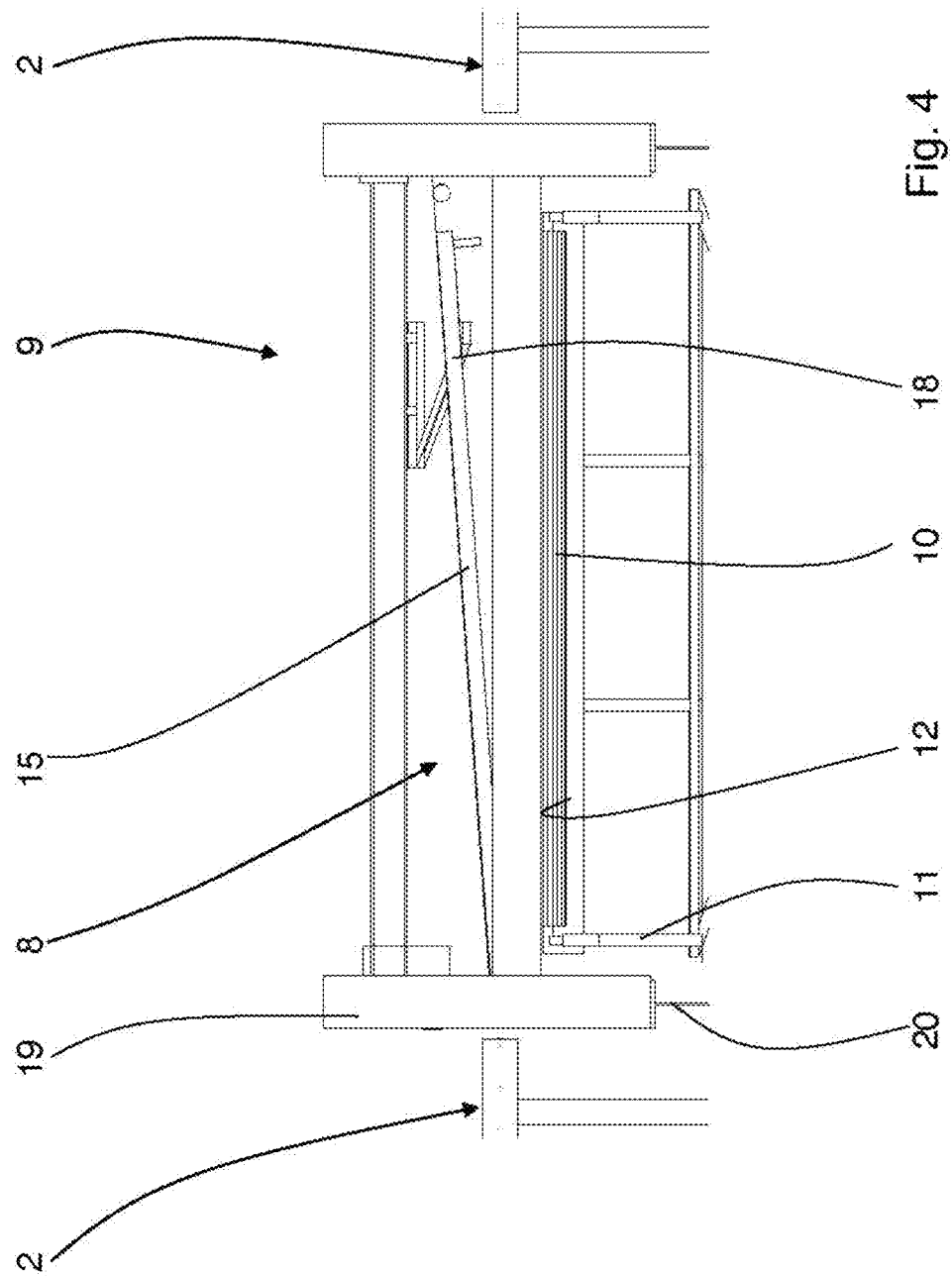
FIG. 4 is a detail view of an outfeed mechanism.

FIG. 3 shows the opposite process and hence the activation of the outfeed device 8. The switching frame 19 has been moved back to its initial position. On the inlet side, the endless belts 6 are raised by an unillustrated mechanism with the effect that boards 10 coming from the first treatment station B1 are moved beneath the belts 6 of the section 9. The endless belts 6 assume the task of a belt drive 15 or a guide and centering device 18 above the board 10 (not shown) that is to be fed out. This may be more clearly visible in the detailed view of FIG. 4. With this outfeed device, the board is thus guided onto the stack of boards that is being formed on the platform 12 of the lift 11 and deposited as the uppermost board. The lift 11 moves down by the amount of the board thickness for each new board.

Such an outfeeding process is useful if the board does not meet the desired quality requirements. The outfeeding process can be automated if a quality detection sensor 21 is provided between the first treatment station B1 and the section 9 of the transport path 2. Its the measurement signal can be relayed to the outfeed device 8. If the quality detection sensor 21 detects that the board is damaged, for example, the belt-supported movement path 9 can be moved up on the inlet side, so that the rejected board is diverted from the web travel path 2 onto the lift 11.

Both for the infeed device 7 and for the outfeed device 8, the roller or belt-supported section 9 of the web travel path must be moved in a direction other than the travel direction R in order to make the corresponding process possible, normally perpendicular to the direction R.

We claim:

1. A conveyor for transporting a board along a path in a transport direction between treatment stations, the conveyor comprising:
    an upstream conveyor section;
    a downstream conveyor section spaced downstream in the direction from and aligned with the upstream section and defining therewith a horizontal support plane;
    a center conveyor section between the upstream and downstream conveyor sections, the upstream, downstream, and center sections each being provided with rollers or belts for moving the board from the upstream section through the center section into the downstream section;
    means for moving the center conveyor section transversely of the direction from a pass-through position aligned and level with the upstream and downstream sections to an offset position spaced therefrom horizontally or vertically;
    a platform underneath the center section and moveable vertically between an upper offset position spaced below from the plane and a lower flush position level with the plane; and
    lift means for moving the platform vertically between the upper offset and lower flush positions; and
    means for, when the center section is in the offset position and the platform is in the lower flush position, either pulling a board off the platform and onto the downstream section or for guiding and depositing a board from the upstream section onto the platform.

2. The board conveyor according to claim 1, wherein the platform is movable only vertically.

3. The board conveyor according to claim 1, wherein the lift means moves the platform in vertical increments substantially equal to a thickness of the boards.

4. The board conveyor according to claim 1, further comprising:
    guide and centering elements for aligning the boards to the transport direction.

5. The board conveyor according to claim 1, further comprising:
    a common frame carrying the rollers or belts of the center section and the means for pulling a board off and for depositing a board onto the platform.

6. The board conveyor according to claim 5, wherein in the offset position the center section is above the plane and the respective belts or rollers engage down on a board arriving on the upstream section and guide it the board onto the platform and form the means for pulling a board off and depositing it the board onto the platform.

7. The board conveyor according to claim 5, wherein in the offset position the belts or rollers of the center section are displaced horizontally and laterally from between the upstream section and the downstream section and the means for pulling are displaced into position between the upstream section and the downstream section.

8. The board conveyor according to claim 1, further comprising:
    a quality selection sensor coupled to the means for pulling and depositing for activating the means for pulling when a defective board is detected and depositing the board on the platform.

9. A method of conveying boards along a path formed by an upstream conveyor section, a center conveyor section and a downstream conveyor sections of a conveyor, the method comprising the step of:
    in a pass-through position setting the center section level with and between the upstream and downstream sections and operating the sections synchronously to move the boards in a longitudinal travel direction from the upstream section across the center section and downstream along the downstream section, each of the sections being formed by drivable belts or rollers;
    in a outfeed position raising the center section and feeding the boards from the upstream section onto a platform underneath the center section; and
    in an infeed position shifting the center section laterally away from in between the upstream and downstream sections, then raising a board to be fed in on the platform to a position level with the upstream and downstream sections, and pulling or pushing the board to be fed in from the platform onto the downstream conveyor section.

10. The method according to claim 9, wherein the rollers or belts of the center section are in a position substantially level with a transport plane of the upstream and downstream conveyors in the pass-through position, and at a higher position above level offset from the plane in the outfeed position to guide a board from the upstream conveyor section onto the platform by contact with an upper surface of the board being guided.

11. The method according to claim 9, further comprising the step of:
    supporting a stack of the boards of substantially the same thickness on the platform and raising it the stack in increments equal to the thickness in the infeed position.

12. The method according to claim 9, wherein the board is pushed or pulled by grabs carried on a frame also carrying the center section.

13. The method according to claim 9, further comprising the step of:
    moving boards horizontally to the platform for feeding into the conveyor in the infeed position or for moving boards removed from the conveyor horizontally from the platform.

* * * * *